Aug. 26, 1952  M. DAVIDSON  2,608,053
VARIABLE AREA DIFFUSER OR EFFUSER
Filed May 3, 1946

Inventor
Milton Davidson
By
Attorney

Patented Aug. 26, 1952

2,608,053

UNITED STATES PATENT OFFICE 2,608,053

VARIABLE AREA DIFFUSER OR EFFUSER

Milton Davidson, Newport News, Va.

Application May 3, 1946, Serial No. 666,934

7 Claims. (Cl. 60—35.6)

(Granted under the act of March 3, 1883, as amended April 30, 1928; 370 O. G. 757)

This invention relates to variable area nozzles and in greater particularity to their application to jet engines and the like.

In combustion engines, especially of the aircraft reaction type which utilize the energy of the products of combustion for effecting thrust, it has been found expedient, in the interests of efficiency and for other reasons, to provide such engines with variable area exhaust nozzles. In aircraft installations especially, where operating conditions vary between wide limits, it is important that a wide range of exhaust areas be available so that the optimum area may be chosen for each of the variable operating conditions. Thus under take-off conditions it is often desirable to employ a large exhaust area whereas under other conditions of flight at variable speed and/or altitude the area must be reduced to achieve the maximum efficiency or thrust for those particular conditions.

One of the familiar expedients for achieving the foregoing, is a somewhat conical shaped device which is movable within and axially of a generally conical shaped nozzle, the relative position of the two elements determining the area of the annulus therebetween and hence the effective nozzle area. The device aforementioned is sometimes referred to as the nozzle "bullet" and one example of its use is in association with the well known Camponi-Campini jet propelled aircraft. While this device has achieved reasonable success it has certain inherent disadvantages. In the first place, if a bullet be interposed in a nozzle, the effective diameter and surface area of the nozzle wall must be increased over that of a nozzle wherein no bullet is used, if a certain effective nozzle area is desired. Since the nozzle wall area together with the exposed area of the bullet present surfaces over which gases at high velocity must flow, it follows that the frictional losses will be greater than in a nozzle in which no bullet is employed. Secondly, the bullet must necessarily be surrounded with gases at high temperature and either a complicated cooling system for same must be provided or the bullet be constructed of special heat resistant material. Further, the bullet adds complexity to the jet engine, both with respect to design, construction, and maintenance, and in addition, adds objectionable weight to the unit.

The present invention obviates the foregoing and other disadvantages and it is therefore one of the principal objects of the invention to provide a jet engine exhaust pipe which contains no restrictions therewithin.

Another object is to reduce the overall diameter of a jet exhaust nozzle while still maintaining a desired cross sectional area thereof.

Another object is the provision of a variable area exhaust nozzle which has a constant cone angle regardless of its effective cross sectional area.

Another object is the provision of a nozzle which increases in length as its diameter is reduced.

A further object is the provision of a variable area nozzle which has a minimum number of parts together with simplified actuating mechanism for same.

Still further objects will become more apparent from a consideration of the specification to follow, the accompanying drawing and the appended claims.

Figure 1:
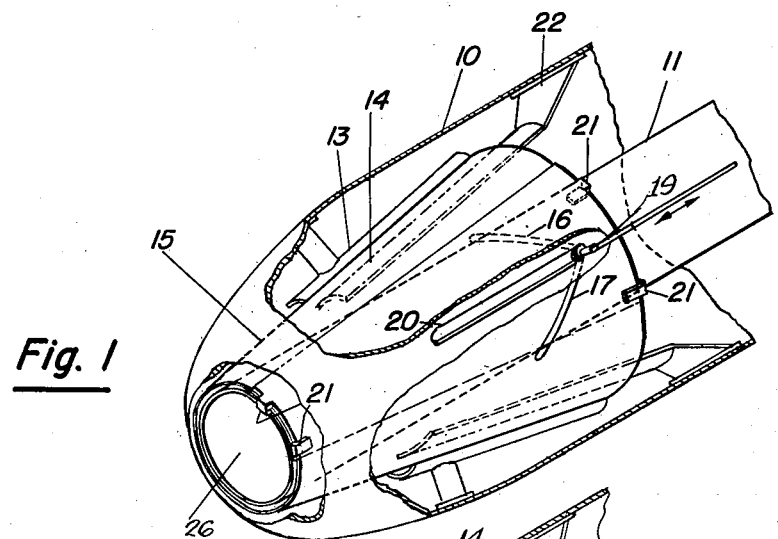
Fig. 1 represents a diagrammatic view in perspective of one embodiment of the invention showing a variable area nozzle in one position of adjustment.

Referring to the drawing, 10 represents a casing which may be the terminal portion of a fuselage or the jet engine casing proper if the unit is wing mounted. Numeral 11 represents a portion of the exhaust pipe, the rearward portion of which it is desired to render of variable cross sectional area. The products of combustion issue through this pipe at high velocity and their reaction is what produces thrust to propel the unit forwardly. Supported by casing 10 are two conical guide surfaces 13 and 14, shown diagrammatically for simplicity of illustration. These guides may be provided with roller or other antifriction means if so desired. Between these two surfaces a conical nozzle 15 is guidingly supported for axial movement. This element is in the form of a flexible sheet of metal, conical in shape, with its longitudinal edges in overlapping relationship. It is thus apparent that if nozzle 15 is moved axially between guide surfaces 13 and 14 it will collapse or expand, the amount of overlap of the free edges changing in accordance with its axial position and the size of the exit nozzle opening 26 decreasing or increasing accordingly.

Figure 2:
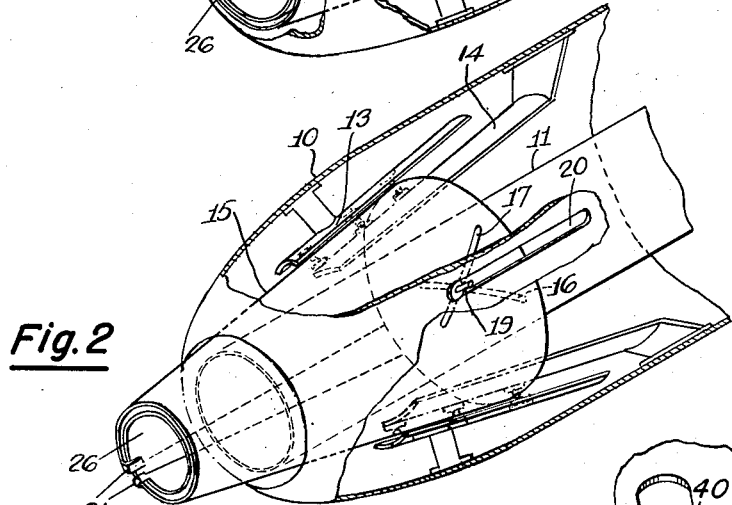
Fig. 2 is a view similar to Fig. 1 showing the nozzle in another position of adjustment.

To effect longitudinal movement of 15, it is provided with slots 16 and 17, each slot being near the respective free longitudinal edge thereof, and into which a pin 19 extends. This pin also engages slot 20 in surface 10 which restrains pin 19 to rectilinear movement longitudinally of the unit. It becomes apparent, therefore, that if the pin 19, as shown in Fig. 1, is moved rearwardly (to the left) it will simultaneously engage slots 16 and 17 and by the cam action therein force the free longitudinal edges of 15 into increased overlapping relationship. Since nozzle 15 is constrained to move between guides 13, 14, nozzle 15 will also move rearwardly and the nozzle opening 26 will decrease in area. Fig. 2 shows pin 19 near one end of the slots 16, 17 and 20, with nozzle opening 26 near its minimum area. Overlapping guides 21 retain the fore and aft edges of 15 in nesting relationship but permit the collapsing movement above described. Pin 19 may be actuated by any suitable mechanism such as a hydarulic cylinder, rack and pinion, etc., as will be understood in the art.

Figure 3:
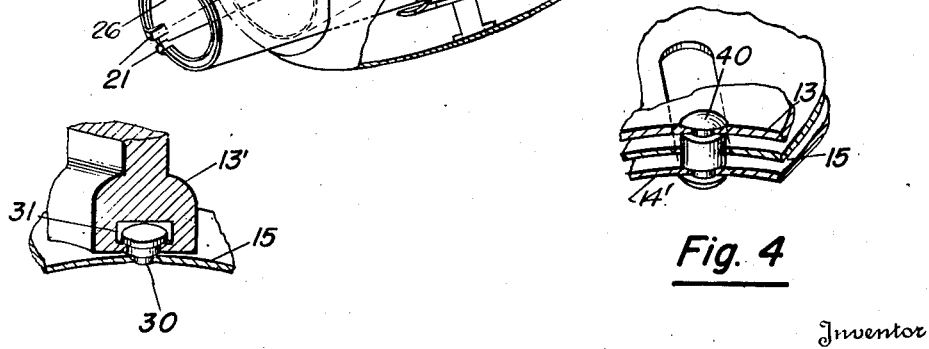
Fig. 3 is a modification of a detail of the nozzle supporting means.

Fig. 3 illustrates a modified form of guide for nozzle 15. In this embodiment guide 14 is eliminated and nozzle 15 carries a plurality of headed supports 30 slidably mounted in channels 31, the latter being provided in guides 13'.

Figure 4:
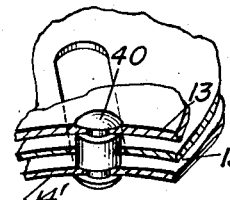
Fig. 4 is another modification of a detail of the nozzle supporting means.

Fig. 4 illustrates another modified form of guide for nozzle 15. In this embodiment support 13 carries inner guide 14' by means of a plurality of spacers 40 secured to both 13 and 14', this construction eliminating the end support at 22 as shown in Fig. 1. Spacers 40 pass through slots in 15 arranged similar to slots 16 and 17 of Fig. 1 so that as the nozzle 15 moves axially between 13 and 14', it will collapse or expand in the same manner as the embodiment of Fig. 1.

While a single example of the invention has been illustrated in connection with a jet engine, wherein the nozzle utilizes expanding gases to increase the velocity thereof and thus increase their kinetic energy, it is apparent that the invention has application to gas or liquid flow wherein diffusion is desired. In the latter case the direction of flow would merely be reversed, the gas or liquid entering 26 and discharging through the opposite end of the cone. If discharge after diffusion were to atmosphere, conduit 11 would be eliminated, whereas if the flow were to continue after diffusion conduit 11 could be constructed to join to the larger end of the cone. The variable nozzle will also be useful in conducting static tests of jet engines or other devices wherein it is desired to determine test characteristics with variable orifices. It is apparent also that while a relatively small cone angle has been illustrated, this angle may be made larger or smaller, whereby the rate of change of nozzle area with respect to longitudinal movement may be chosen as desired. Further, while the nozzle is illustrated as circular in section, it could, by reason of its flexible nature, be given other curved shapes such as an ellipse, for example, the guideways in which it is constrained to move being formed to the desired shape. It is to be understood, accordingly, that the specific illustrations have been given by way of example rather than by way of limitation and that the many modifications and uses of the invention which fall within the spirit thereof are to be included within the scope of the appended claims.

The invention described herein may be manufactured and used by or for the Government of the United States of America for governmental purposes without the payment of any royalties thereon or therefor.

What is claimed is:

1. A nozzle for jet engines comprising a casing, a tail pipe of cylindrical shape extending longitudinally within said casing, a second tail pipe of frusto-conical shape telescopically arranged over the rearward end of said first tail pipe, said second tail pipe composed of a metal sheet with overlapping edges and slidably secured in close association with said first tail pipe, cam guide means for simultaneously reducing the conical size of said second tail pipe without changing the slope angle thereof and projecting said reduced pipe rearwardly from said end of said first pipe, said cam guide means comprising a slot positioned in the wall of said casing in an axial plane thereof, a pair of angularly positioned intersecting slots in overlapping areas of said second pipe, and a movable pin slidable lengthwise in the first defined slot and engageable in said pair of intersecting slots at their point of intersection.

2. An adjustable nozzle for jet engines comprising guide surfaces, a flexible frusto-conically shaped sheet provided with a discharge opening and having overlapping axial edges with guide means for slidably maintaining its overlapping ends in alignment, said sheet being slidably mounted in said space between said guide surfaces, and means for moving said sheet axially and in constant alignment with respect to said surfaces and to vary simultaneously the size of said discharge opening, said guide surfaces including at least one pair of relatively closely spaced plates, one member of said pair positioned exteriorly of and parallel to the surface of said frusto-conically shaped sheet and the other member of the said pair positioned interiorly of and parallel to the surface of said frusto-conically shaped sheet, and a plurality of studs extending between and firmly attaching said interiorly positioned member to said exteriorly positioned member, said studs passing through appropriate slots in said frusto-conically shaped sheet.

3. An adjustable nozzle for jet engines comprising guide surfaces, a flexible frusto-conically shaped sheet provided with a discharge opening and having overlapping axial edges with guide means for slidably maintaining its overlapping ends in alignment, said sheet being slidably mounted in said space between said guide surfaces and means for moving said sheet axially and in constant alignment with respect to said surfaces and to vary simultaneously the size of said discharge opening, said guide surfaces including at least one T-shaped structural supporting member, a T-shaped slot extending longitudinally in the cross-bar portion of said supporting member, a plurality of stud shafts mounted on said sheet, and appropriately shaped rollers mounted on said stud shafts adapted to interfit with said T-shaped slot to support and guide said frusto-conically shaped sheet.

4. An adjustable nozzle for jet engines comprising a tubular outlet duct having a terminal discharge section, at least two opposed guides formed of closely spaced parallel and fixed plates lying in conical surfaces including said terminal discharge section, a flexible frusto-conically shaped sheet having free overlapping side edges and a discharge opening adjacent and including said duct terminal section, said sheet being mounted for sliding movement between the plates of said guides, and means for moving said sheet axially, said sheet being in sliding contact with said plates whereby the sheet discharge opening is varied in diameter without variation in the cone angle thereof.

5. The adjustable nozzle for jet engines as defined in claim 4 with guide means for slidably maintaining the overlapping ends of the sheet discharge opening in alignment.

6. The adjustable nozzle for jet engines as defined in claim 4, said sheet moving means including a plate support in fixed relation to said duct having a slot formed therein in parallel relation to the duct axis, and a pin slidably mounted in said slot and secured to said sheet.

7. The adjustable nozzle for jet engines as defined in claim 6 with the pin attachment to said sheet including angularly related slots, one formed in each overlapping edge of said sheet in overlying adjacency and diverging toward the sheet discharge opening, whereby on movement of said pin both axial and transverse pressure is applied to said sheet.

MILTON DAVIDSON.

REFERENCES CITED

The following references are of record in the file of this patent:

UNITED STATES PATENTS

| Number | Name | Date |
|---|---|---|
| 157,526 | Leggett | Dec. 8, 1874 |
| 351,968 | Derrick | Nov. 2, 1886 |
| 605,183 | Johnstone | June 7, 1898 |
| 851,603 | Long | Apr. 23, 1907 |
| 1,114,440 | Brix | Oct. 20, 1914 |
| 2,099,412 | Seidler | Nov. 16, 1937 |
| 2,280,835 | Lysholm | Apr. 28, 1942 |
| 2,342,262 | Franz | Feb. 22, 1944 |
| 2,408,099 | Sherman | Sept. 24, 1946 |

FOREIGN PATENTS

| Number | Country | Date |
|---|---|---|
| 363,365 | Great Britain | Dec. 16, 1931 |
| 375,121 | Germany | May 7, 1923 |
| 626,755 | Germany | Mar. 2, 1936 |